United States Patent
Fink et al.

(10) Patent No.: US 7,487,670 B2
(45) Date of Patent: Feb. 10, 2009

(54) METHODS FOR DETERMINING THE DIRECTION OF ROTATION OF ROTATING BODIES

(75) Inventors: Alexander Fink, Dittelbrunn (DE); Oliver Nelles, Siegen (DE)

(73) Assignee: Siemens Aktiengesellschaft, Munich (DE)

( * ) Notice: Subject to any disclaimer, the term of this patent is extended or adjusted under 35 U.S.C. 154(b) by 208 days.

(21) Appl. No.: 11/406,703

(22) Filed: Apr. 19, 2006

(65) Prior Publication Data

US 2006/0235641 A1  Oct. 19, 2006

(30) Foreign Application Priority Data

Apr. 19, 2005  (DE) .................. 10 2005 018 107

(51) Int. Cl.
*B60C 23/00* (2006.01)
*B60C 23/04* (2006.01)

(52) U.S. Cl. .................... 73/146.5; 340/442

(58) Field of Classification Search ............. 73/509, 73/146.5, 146.3, 865.9; 702/151; 340/440–445, 340/671; 701/41–47, 26–29, 37, 65, 70
See application file for complete search history.

(56) References Cited

U.S. PATENT DOCUMENTS

| | | | |
|---|---|---|---|
| 5,173,858 A * | 12/1992 | Wada et al. ................ 701/37 |
| 6,142,026 A | 11/2000 | Ohashi et al. | |
| 6,446,502 B1 | 9/2002 | Normann et al. | |
| 6,873,931 B1 * | 3/2005 | Nower et al. ............... 702/151 |
| 6,917,866 B2 * | 7/2005 | Grotendiek et al. ......... 701/45 |
| 7,240,971 B2 * | 7/2007 | Yasui et al. ................ 303/146 |
| 7,284,408 B2 * | 10/2007 | Kato ....................... 73/1.37 |
| 2002/0082125 A1 | 6/2002 | Markin | |
| 2003/0197603 A1 | 10/2003 | Stewart et al. | |
| 2006/0044125 A1 | 3/2006 | Pierbon | |

FOREIGN PATENT DOCUMENTS

| | | |
|---|---|---|
| DE | 197 35 686 A1 | 2/1999 |
| DE | 199 21 413 C1 | 11/2000 |
| DE | 198 56 861 B4 | 8/2004 |
| DE | 103 16 074 A1 | 10/2004 |
| EP | 0 760 299 A1 | 7/1996 |
| EP | 1 172 656 A1 | 7/2000 |
| WO | WO 2004/048131 A1 | 10/2004 |

* cited by examiner

*Primary Examiner*—Helen C. Kwok
(74) *Attorney, Agent, or Firm*—Laurence A. Greenberg; Werner H. Stemer; Ralph E. Locher

(57) ABSTRACT

A method determines a direction of rotation of a rotating body about its axis of rotation by measuring two acceleration signals x and y with an acceleration sensor. The two acceleration signals x and y are at a 90° angle to each other, are oriented not parallel to the axis of rotation, and both a centrifugal acceleration generated by a circular movement and a gravitational acceleration are taken into account. The measured acceleration signals x and y are differentiated mathematically. The differentiated x acceleration signal is differentiated a further time and correlated with a y signal that has been differentiated once for obtaining a correlation function. The differentiated y acceleration signal can be differentiated a further time and correlated with the x signal that has been differentiated once for obtaining a second correlation function. The method determines the direction of rotation of rotating tires of a motor vehicle.

8 Claims, 3 Drawing Sheets

Wheel Angle [rad]

Wheel Angle [rad]

METHODS FOR DETERMINING THE DIRECTION OF ROTATION OF ROTATING BODIES

BACKGROUND OF THE INVENTION

Field of the Invention

The invention relates to methods for determining the direction of rotation of a rotating body about its axis of rotation by measuring two acceleration signals x and y with at least one acceleration sensor.

One function of tire pressure monitoring systems is the automatic localization of the individual wheels. The function is used for the purpose of automatically determining the position of a wheel or, more specifically, the wheel electronics installed in the wheel. This enables warnings in relation to a tire that are directly linked to the corresponding wheel position to be displayed to the driver. In the localization process a distinction is made between full localization (position of all four wheels), axle localization (front/rear) and side localization (right/left).

An approach to side localization includes determining the direction of rotation of the wheel electronics, which information is transmitted to the central control device.

Based on the direction-of-rotation signal, the wheel position (left/right) can be determined with the aid of the direction of movement of the vehicle. Alternatively, the wheel position can be determined directly by the wheel electronics, either based on plausibility checks or on the assumption that the vehicle travels mostly in a forward direction.

An approach to direction-of-rotation detection in the wheel electronics is implemented with the aid of two-dimensional acceleration sensors. The sensors measure acceleration signals of the specified directions x and y. The direction-of-rotation detection is based on the evaluation of the phase displacement of the acceleration signals of the sensors for the x and y direction, produced due to the gravitation g.

European patent EP 0 760 299 B1 discloses a tire pressure monitoring system which determines the direction of rotation of the tires and the direction of travel of the motor vehicle by a sensor on each wheel, and thereby determines the tire position. The direction of rotation of the wheel is established via what is referred to as a rolling switch that triggers a number of switches in a sequence that is dependent on the direction of rotation.

It is known from European patent EP 1 172 656 A1 (corresponding to U.S. patent disclosure No. 2002/0047715 A1) that the side localization takes place based on the phase difference between the signals of two accelerometers within the wheel electronics. A specific solution indicating how the phase difference is evaluated, i.e. how the localization result is obtained, is not given. It is also described that the centrifugal acceleration has no significant influence on the evaluation of the phase relationship.

It is also known from U.S. patent disclosure No. 2003/0197603 A1 that the side localization takes place based on the phase displacement between the signals of two acceleration sensors within the wheel electronics. A specific solution indicating how the phase difference is evaluated, i.e. how exactly the localization result is obtained, is also not given here. It is described that the influence of the centrifugal acceleration is present, but is of no relevance for the evaluation.

It is known from international patent disclosure WO 2004/048131 A1 (corresponding to U.S. patent disclosure No. 2006/0044125 A1) that the side localization takes place based on the phase shift between the signals of two accelerometers mounted within the wheel electronics. A specific solution for the evaluation is not given here either. The shock sensors, as they are called, described therein are specified in terms of functionality as accelerometers.

A disadvantage of the prior art is that the phase relationship of the acceleration signals or of the corresponding sinusoidal oscillations to one another and the associated determination of the direction of rotation of the rotating body cannot be established. Furthermore, the processing of the sinusoidal signals which are overlaid with rotational speed-dependent mean values due to the centrifugal forces is not solved.

SUMMARY OF THE INVENTION

It is accordingly an object of the invention to provide methods for determining the direction of rotation of rotating bodies that overcomes the above-mentioned disadvantages of the prior art methods of this general type, which determines the direction of rotation of rotating bodies, in particular for determining the direction of rotation of the wheel of a motor vehicle.

The present invention makes use of the idea of measuring two acceleration signals within a body for the purpose of direction-of-rotation detection of rotating bodies, e.g. tires of motor vehicles, and processing the signals further in a mathematical procedure in such a way that the direction of rotation of the body can be determined. In connection with motor vehicles the side of the vehicle on which the tires are located is finally determined from the direction-of-rotation information and the direction of travel that is to be determined.

With the methods for determining the direction of rotation of a rotating body, the following acceleration signals x and y are generated at the sensors in the case of a body rotating in the clockwise direction:

$$x(t) = A \cdot \sin(\omega t) + A_0$$

$$y(t) = B \cdot \sin(\omega t - \pi/2) + B_0 \quad \text{(trailing)}.$$

In the case of a body rotating in the anticlockwise direction, the following acceleration signals are produced at the sensors:

$$x(t) = A \cdot \sin(\omega t) + A_0$$

$$y(t) = B \cdot \sin(\omega t + \pi/2) + B_0 \quad \text{(leading)}.$$

A 0°/90° phase arrangement is present between the two signals x and y. In other words, they must be adjusted essentially at a 90° angle to each other, i.e. in the defined directions x (0°) for the horizontal movement direction and y (90°) for the vertical movement direction. The method is stable with respect to small angular deviations of, for example, 5°, such as result in particular due to installation tolerances. In general, the sensor orientation does not have to be horizontal and vertical. The method can also be applied to sensor orientations in which the complete sensor configuration is rotated and the angle of 90° between x and y is maintained.

Without in any way restricting the generality, the absolute phase of the x(t) signal is set to 0, since it is only the phase difference of the two signals x(t) and y(t) that counts. In this case the angular frequency of the rotating body is designated by ω, which frequency is in turn dependent on the rotational speed of the body. The frequency of the oscillations does not have to be determined, calculated or estimated explicitly. This is advantageous since, for example, the rotational speed of a wheel may change constantly as a function of the speed of the vehicle. The amplitude of the oscillations likewise does not have to be determined, calculated or estimated explicitly. The mean values $A_0$ and $B_0$ correspond to the centrifugal acceleration at the sensors and consequently depend on the rotational speed of the wheel and the precise installation angle of the sensors. As the sensors can never be mounted at exactly the same angle due to installation and manufacturing tolerances, the mean values for x(t) and y(t) are generally different. An important requirement for a solution that is relevant to real-world practice is the effective elimination of the mean values as they are typically unknown.

The mean values can be eliminated by mathematical differentiation. The acceleration signals x and y supply the following signals for the rotation in the clockwise direction:

$$x_s(t) = A_s \cdot \cos(\omega t)$$

$$y_s(t) = B_s \cdot \cos(\omega t - \pi/2) = B_s \cdot \sin(\omega t) \quad \text{(trailing)}$$

and in the anticlockwise direction:

$$x_s(t) = A_s \cdot \cos(\omega t)$$

$$y_s(t) = B_s \cdot \cos(\omega t + \pi/2) = -B_s \cdot \sin(\omega t) \quad \text{(leading)}.$$

Alternatively (where applicable, also cumulatively) it is possible to perform the measurement of the acceleration signals using what are referred to as shock sensors. Shock sensors already supply a signal that has been differentiated once. By this measure a first mathematical differentiation would be anticipated.

Following the elimination of the mean values, a distinction can be made between the two above cases. The further processing is based on the differentiation of one of the two sensor signals with a subsequent correlation with the other sensor signal. For the case that $x_s(t)$ is differentiated a further time, the following result is obtained for the rotation in the clockwise direction:

$$x'_s(t) = -A'_s \cdot \sin(\omega t)$$

$$\text{Korr1}\{x'_s(t), y_s(t)\} = \int x'_s(t) \cdot y_s(t) dt = -A'_s \cdot B_s [t/2 - \sin(2\omega t)/(4\omega)].$$

In this case Korr1 $\{x'_s(t), y_s(t)\}$ denotes the correlation of the signal $x'_s(t)$ with the signal $y_s(t)$.

And for the rotation in the anticlockwise direction analogously:

$$x'_s(t) = -A'_s \cdot \sin(\omega t)$$

$$\text{Korr1}\{x'_s(t), y_s(t)\} = \int x'_s(t) \cdot y_s(t) dt = A'_s \cdot B_s [t/2 - \sin(2\omega t)/(4\omega)].$$

For long time periods t the term t/2 in the square brackets is dominant; then the rotation in the clockwise direction is differentiated from the rotation in the anticlockwise direction by the sign: negative for the clockwise direction and positive for the anticlockwise direction. With an increasing number of measured values the subsequent correlation (Korr1) leads to a more stable end value, since the signal/noise ratio is increased. The signal noise is reduced to the desired order of magnitude at the expense of the decision time or measurement frequency. This results in an extremely small computing overhead and the direction-of-rotation detection is performed with any quality.

An improved noise suppression is achieved by the forming of a difference between two correlation functions (Korr1; Korr2). In this case $y_s(t)$ is differentiated and correlated with $x_s(t)$. For the rotation in the clockwise direction this yields:

$$y'_s(t) = B'_s \cdot \cos(\omega t)$$

$$\text{Korr2}\{x_s(t), y'_s(t)\} = \int x_s(t) \cdot y'_s(t) dt = A_s \cdot B'_s [t/2 + \sin(2\omega t)/(4\omega)].$$

For the rotation in the anticlockwise direction analogously:

$$y'_s(t) = -B'_s \cdot \cos(\omega t)$$

$$\text{Korr2}\{x_s(t), y'_s(t)\} = \int x_s(t) \cdot y'_s(t) dt = -A_s \cdot B'_s [t/2 + \sin(2\omega t)/(4\omega)].$$

The combination of the two correlations (Korr1; Korr2) in the form of Korr=Korr1$\{x'_s(t), y_s(t)\}$−Korr2$\{x_s(t), y'_s(t)\}$ then yields a better noise suppression, because an averaging between two independent noise sources (sensor x and sensor y) is performed.

The practical implementation of the above-described method requires at least two measurements, ideally taken in quick succession, by the sensors in order to be able to approximate a differentiation by a difference quotient $DQ_x$ or $DQ_y$; for x, for example:

$$DQ_x = x'_s(t) \approx [x_s(t) - x_s(t - \Delta T)]/\Delta T$$

where $\Delta T$ represents the time interval between two measurements. If signals x(t), y(t) of an acceleration sensor are present instead of signals $x_s(t)$, $y_s(t)$ of a shock sensor, then the signals $x_s(t)$, $y_s(t)$ must first be generated by differentiation in the above-described manner, which signals are then derived in turn. In this case at least three measurements, ideally taken in quick succession, by the acceleration sensors are required in total.

When more than two measurements are performed at short time intervals, a resulting redundancy is used for noise reduction. This can be effected by conventional finite impulse response (FIR) or infinite impulse response (IIR) filtering. An alternative to this is the determination of an approximation function of the measured values, such as, for example, a regression line or a regression polynomial.

The practical calculation of the correlation can be performed by the summation of the terms $x'_s(t_i) \cdot y_s(t_i)$ at the times $t_i$, i.e. the integral is approximated by a sum total. In this case the times $t_i$ can lie at arbitrary intervals and take place at arbitrary phases within a sinusoidal oscillation, provided they do not always strike a zero passage.

Furthermore an extremely small data transfer from the sensors to the central receiver is advantageous. A calibration of the free parameters is simple.

Preceding this, according to the invention a method for determining the direction of rotation of a rotating body about its axis of rotation by the measurement of two acceleration signals x and y by use of at least one acceleration sensor. The two acceleration signals x and y are at a 90° angle to each other, are oriented not parallel to the axis of rotation, and both a centrifugal acceleration generated by a circular movement and a gravitational acceleration g are taken into account. The measured acceleration signals x and y are mathematically differentiated. The differentiated x acceleration signal is differentiated a further time and correlated with a y signal that has been differentiated once for the purpose of obtaining a first correlation function.

Alternatively or cumulatively hereto, a method for determining the direction of rotation of a rotating body about its axis of rotation by the measurement of two acceleration signals x and y by at least one acceleration sensor. The two acceleration signals x and y are at a 90° angle to each other, are oriented not parallel to the axis of rotation, and both a centrifugal acceleration generated by a circular movement and a gravitational acceleration g are taken into account. The measured acceleration signals x and y are mathematically differentiated. The differentiated y acceleration signal is differentiated a further time and correlated with an x signal that has been differentiated once for the purpose of obtaining a second correlation function.

According to the invention the difference is preferably formed from the functions produced in this way.

In a preferred embodiment of the invention a differentiation is approximated using a difference quotient.

In a further preferred embodiment of the invention the integrals of the correlation functions are calculated in an approximation using a sum total.

The invention is suitable in particular for determining the direction of rotation of the rotating tire of a motor vehicle.

Other features which are considered as characteristic for the invention are set forth in the appended claims.

Although the invention is illustrated and described herein as embodied in methods for determining the direction of rotation of rotating bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
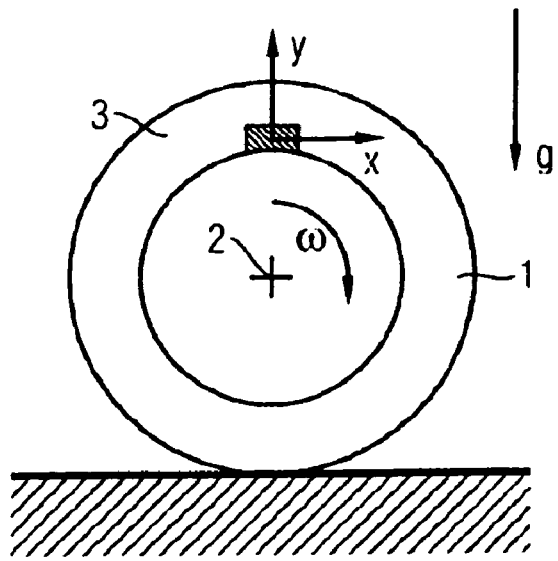
FIG. 1 is a schematic representation of a rotating body with its acceleration components according to the invention.

Referring now to the figures of the drawing in detail and first, particularly, to FIG. 1 thereof, there is shown a schematic representation of a rotating body 1 about an axis of rotation 2 with its acceleration components in the horizontal x and the vertical y direction. Sensors 3 measure the acceleration components x and y. The acceleration signals x and y are disposed phase-shifted by 90°. In the actual embodiment the x signal is disposed parallel to the horizontal axis at 0° and the y signal is disposed parallel to the vertical axis at 90°.

Alternative arrangements are conceivable. In particular the signals x and y can be disposed at −45° and 45° respectively. This has the advantageous consequence that the centrifugal acceleration acts only partially on the sensor(s) 3 in each case and these can be implemented with a smaller measurement range.

Fundamentally, the method is stable with respect to small angular deviations such as result, for example, due to installation tolerances. Also represented is the direction of the gravitational acceleration g.

Figure 2:
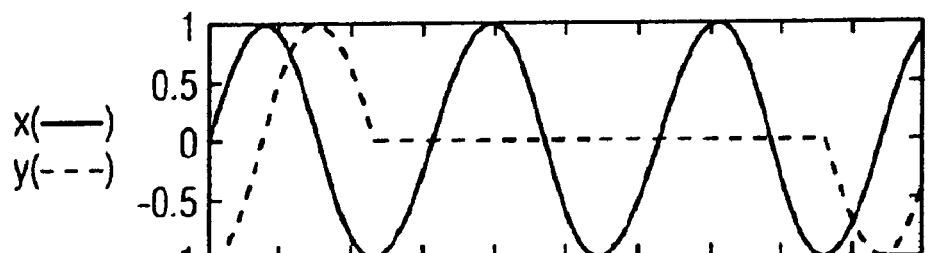
FIG. 2 is a graph of a time curve of acceleration components for two directions of rotation, ignoring centrifugal forces.
Figure 2:
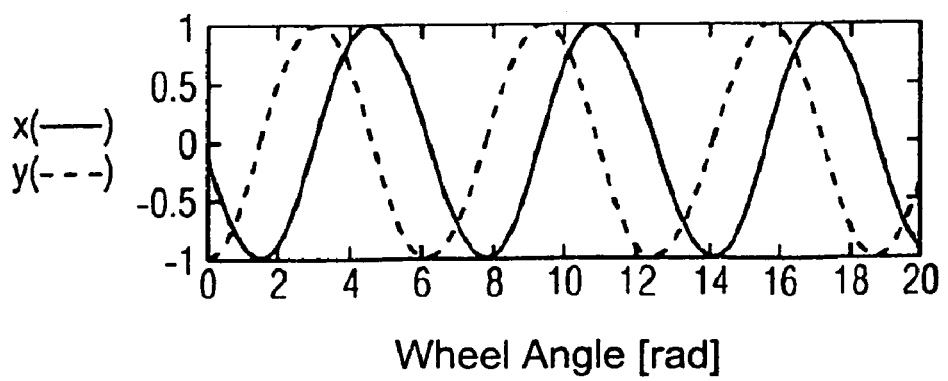

FIG. 2 shows a time curve of the acceleration components x and y for two directions of rotation 2, ignoring the centrifugal forces. Given equal amplitudes, the trailing or leading by 90° of the x or y acceleration component respectively, depending on the direction of rotation 2, is shown. Determination of the phases of the sinusoidal oscillations with respect to each other has previously been associated with a high overhead. The individual acceleration signals would have to be sampled very frequently over a period that depends on the rotational speed of the tire or the speed of the vehicle. Based thereon, a phase shift would be determined which includes an explicit determination, calculation or estimation of the signal frequency as well as of the signal amplitude. This method is very compute-intensive intensive and requires a great deal of energy, which is unsuited, for example, to a battery-operated approach such as is used in the wheel electronics. Moreover the method is susceptible with regard to swiftly changing wheel speeds such as result during rapid acceleration or deceleration of the vehicle.

Figure 3:
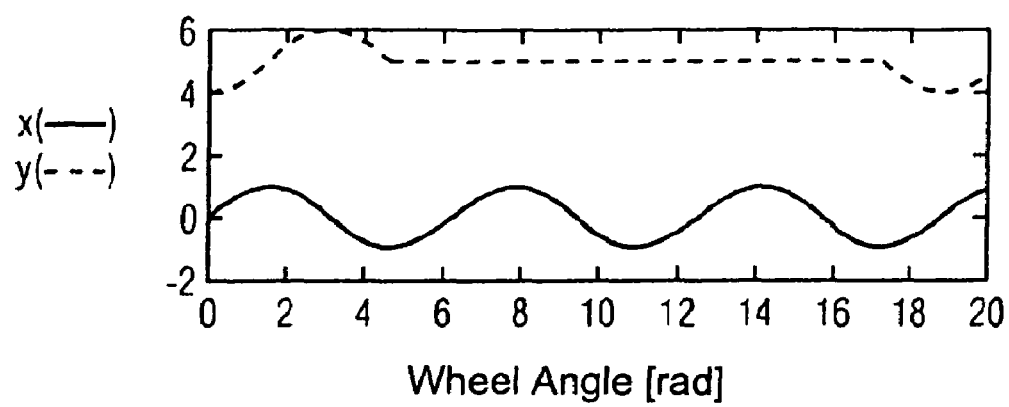
FIG. 3 is a graph of a time curve of acceleration components for one direction of rotation, taking the centrifugal forces into account.

FIG. 3 shows a representation of the acceleration components x and y for a direction of rotation 2, taking the centrifugal forces into account. Both acceleration components, x and y, are propagated as a sinusoidal oscillation parallel to the x axis. In this case the acceleration component in the y direction has a higher mean value than the acceleration component in the x direction and therefore oscillates about a higher zero point. The respective mean values are dependent on the respective rotational speed. Strictly speaking, therefore, the mean values are not constant. However, the changes in the mean values usually take place much more slowly than the inherent changes in the sinusoidal curve. The determination of the phases of the sinusoidal oscillations has previously been associated with the same high overhead as shown in the description referring to FIG. 2.

Figure 4:
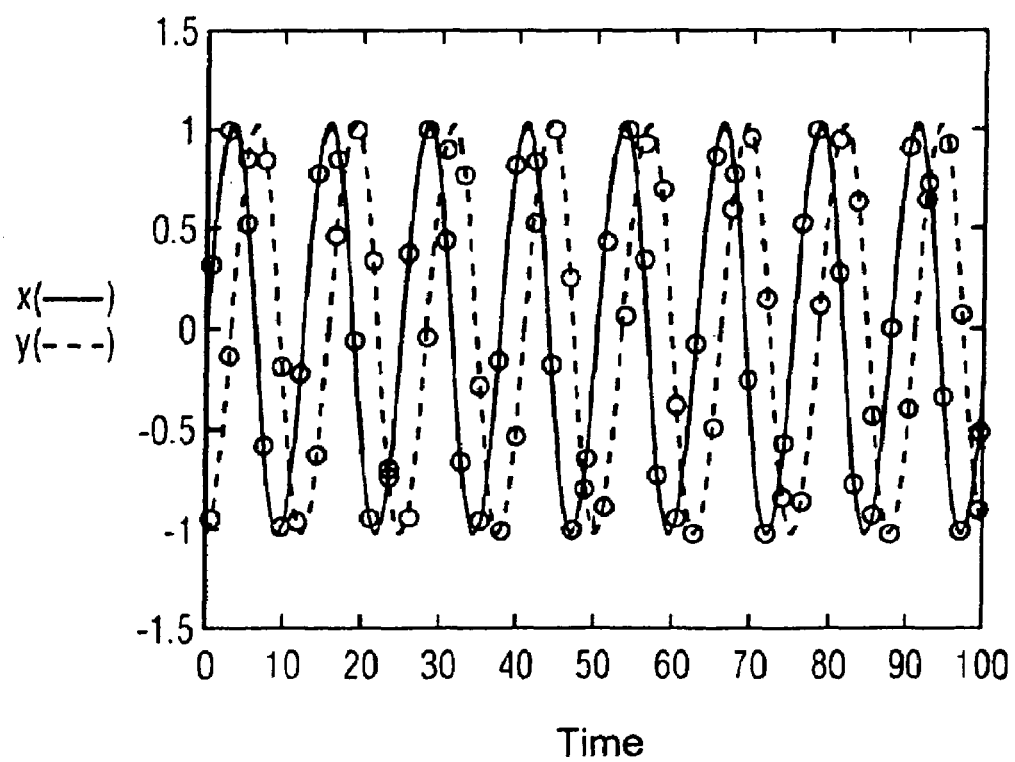
FIG. 4 is a graph of a time curve of the acceleration components $x_s(t)$ and $y_s(t)$.

FIG. 4 shows the time curve of the acceleration components $x_s(t)$ and $y_s(t)$. At the points identified by circles, two measured values were recorded in quick succession for the subsequent correlation. In the simplest case only two quickly succeeding measurements of the sensors are necessary, which measurements can be repeated at arbitrary intervals.

Figure 5:
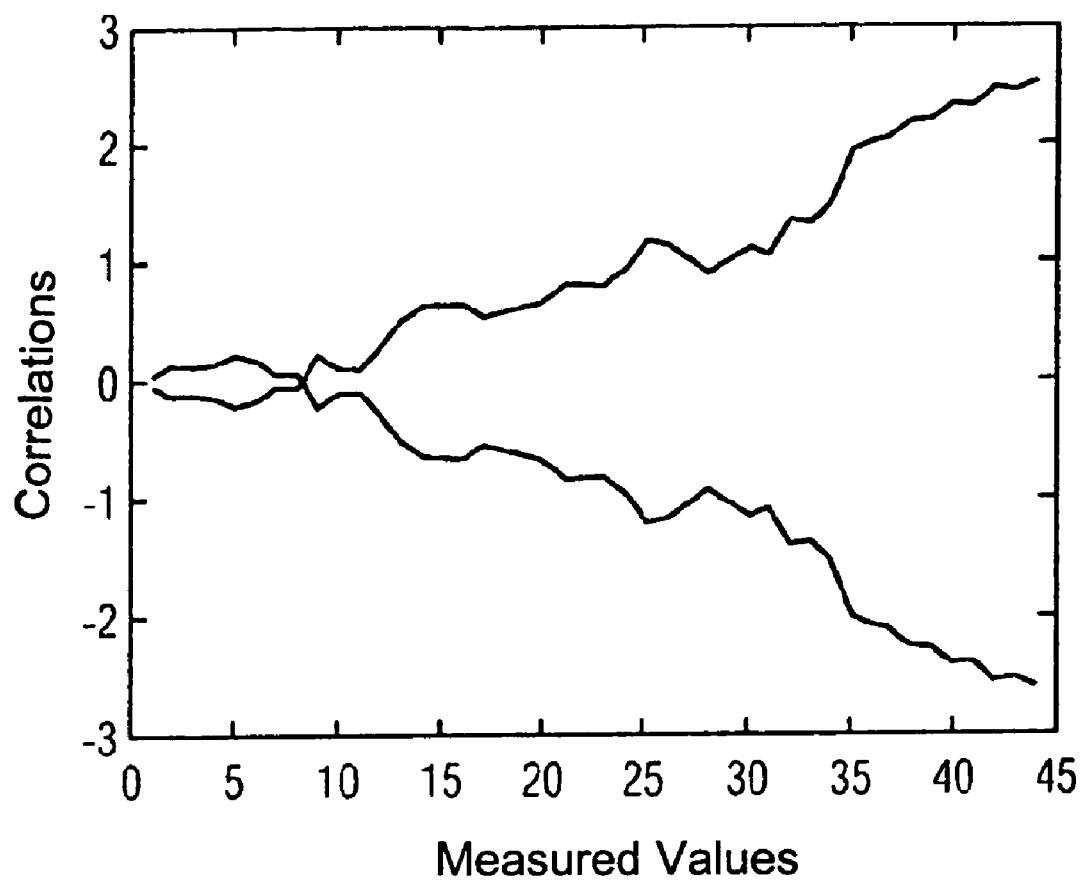
FIG. 5 is a graph of a time curve of two correlation functions for two different directions of rotation.

FIG. 5 shows the shape of a correlation function (either Korr1 or Korr2) for two different directions of rotation. In this case it can be observed that the two curves diverge from each other as the number of measured values increases. Depending on the start conditions, in this case the curves can be assigned a direction of rotation starting from approximately measured value 15. Thus, a more unequivocal conclusion with regard to the direction of rotation of the rotating body is possible with an increasing number of measured values.

In connection with a motor vehicle the question of side localization is of interest; i.e. on which side a tire is positioned. The determination of whether a wheel is mounted "right" or "left" can be made based on the movement of the vehicle. When the vehicle is traveling in a forward direction, the right wheel rotates in the clockwise direction and the left wheel in the anticlockwise direction. When the vehicle is traveling in reverse, the conditions are precisely reversed. If the movement of the vehicle is unknown, it is assumed that the vehicle travels mainly in a forward direction and the percentage share of travel in reverse is small. The correlation method thus eliminates the influence of the travel in reverse.

Finally, a decision in favor of "right" or "left" is necessary on the basis of the time curve of the correlation Korr1 or Korr2 or corresponding correlation functions (Korr). For this, many methods are conceivable. It could be required, for example, that Korr1 and Korr2 or Korr must have been in the negative range for a specific percentage share, e.g. 98%, in order to decide in favor of "right". A decision is also possible upon reaching a specific threshold value for Korr1 and Korr2 or Korr. In addition a specific minimum number of processed measured values could be required, e.g. more than 100, in order to stabilize the decision in relation to the signal noise. Furthermore it makes sense to evaluate the correlations Korr1 and Korr2 or Korr only if they are based on more than a specific number of measured quantities, e.g. 20. It is also possible even to filter the correlations (Korr1; Korr2; Korr) again in order to achieve a higher reliability. With all these approaches a balance is drawn, based on the choice of the parameters (98%, 100, 20, time constant of the filter, etc.), between the required measured data volume, and hence the time required to make a decision, and the reliability of the decision.

The present invention is therefore suitable in particular for determining the direction of rotation of the rotating tire of a motor vehicle.

This application claims the priority, under 35 U.S.C. §119, of German application DE 10 2005 018 107.4, filed Apr. 19, 2005; the prior application is herewith incorporated by reference in its entirety.

We claim:

1. A method for determining a direction of rotation of a rotating body about an axis of rotation, which comprises the steps of:
   measuring two acceleration signals x and y with at least one acceleration sensor resulting in measured acceleration signals x and y, the two acceleration signals x and y being at a 90 degree angle to each other and oriented not parallel to the axis of rotation, and both a centrifugal acceleration generated by a circular movement and a gravitational acceleration g being taken into account;
   differentiating mathematically the measured acceleration signals x and y resulting in a differentiated x acceleration signal and a differentiated y acceleration signal;
   differentiating a further time at least one of the differentiated x acceleration signal and the differentiated y acceleration signal resulting in a further differentiated x acceleration signal and/or a further differentiated y acceleration signal; and
   performing at least one of:
      correlating the further differentiated x acceleration signal with the differentiated y acceleration signal for obtaining a first correlation function; and
      correlating the further differentiated y acceleration signal with the differentiated x acceleration signal for obtaining a second correlation function.

2. The method according to claim 1, which further comprises:
   performing both of the correlating steps for obtaining the first and second correlation functions; and
   using the first and second correlation functions in a common evaluation procedure.

3. The method according claim 1, which further comprises:
   performing both of the correlating steps for obtaining the first and second correlation functions; and
   determining a difference between the first and second correlation functions.

4. The method according to claim 1, which further comprises approximating a differentiation by use of a difference quotient.

5. The method according to claim 1, which further comprises:
   performing both of the correlating steps for obtaining the first and second correlation functions; and
   calculating integrals of the first and second correlation functions in an approximation by use of a sum total.

6. The method according to claim 1, wherein the rotating body is a tire of a motor vehicle.

7. A method for determining a direction of rotation of a rotating body about an axis of rotation, which comprises the steps of:
   measuring two acceleration signals x and y with at least one acceleration sensor resulting in measured acceleration signals x and y, the two acceleration signals x and y being at a 90 degree angle to each other and oriented not parallel to the axis of rotation, and both a centrifugal acceleration generated by a circular movement and a gravitational acceleration g being taken into account;
   differentiating mathematically the measured acceleration signals x and y resulting in a differentiated x acceleration signal and a differentiated y acceleration signal;
   differentiating a further time the differentiated y acceleration signal resulting in a further differentiated y acceleration signal; and
   correlating the further differentiated y acceleration signal with the differentiated x acceleration signal for obtaining a correlation function.

8. A method for determining a direction of rotation of a rotating body about an axis of rotation, which comprises the steps of:
   measuring two acceleration signals x and y with at least one acceleration sensor resulting in measured acceleration signals x and y, the two acceleration signals x and y being at a 90 degree angle to each other and oriented not parallel to the axis of rotation, and both a centrifugal acceleration generated by a circular movement and a gravitational acceleration g being taken into account;
   differentiating mathematically the measured acceleration signals x and y resulting in a differentiated x acceleration signal and a differentiated y acceleration signal;
   differentiating a further time the differentiated x acceleration signal resulting in a further differentiated x acceleration signal; and
   correlating the further differentiated x acceleration signal with the differentiated y acceleration signal for obtaining a correlation function.

* * * * *